United States Patent [19]

Sondergeld et al.

[11] Patent Number: 4,794,572
[45] Date of Patent: Dec. 27, 1988

[54] ACOUSTIC WELL LOGGING METHOD AND SYSTEM FOR OBTAINING A MEASURE OF FORMATION ANISOTROPY

[75] Inventors: Carl H. Sondergeld; Martin L. Smith, both of Broken Arrow, Okla.

[73] Assignee: Amoco Corporation, Chicago, Ill.

[21] Appl. No.: 913,210

[22] Filed: Sep. 30, 1986

[51] Int. Cl.$^4$ .......................... G01V 1/40; E21B 49/00
[52] U.S. Cl. ........................................ 367/31; 367/75; 73/152
[58] Field of Search .................. 73/151, 152, 597, 784, 73/594; 181/104, 106, 108, 111, 112, 102; 367/31, 75, 27, 29, 25, 911, 912; 364/421, 422

[56] References Cited

U.S. PATENT DOCUMENTS

| | | | |
|---|---|---|---|
| 3,330,375 | 7/1967 | White | 367/75 |
| 4,562,557 | 12/1985 | Parks | 367/27 |
| 4,575,830 | 3/1986 | Ingram | 367/26 |
| 4,641,520 | 2/1987 | Mao | 367/75 |
| 4,713,968 | 12/1987 | Yale | 367/31 X |

FOREIGN PATENT DOCUMENTS

| | | |
|---|---|---|
| 1152201 | 8/1983 | Canada . |
| 85305161 | 3/1985 | European Pat. Off. . |
| 85305160 | 5/1985 | European Pat. Off. . |
| 832678 | 4/1983 | South Africa . |

*Primary Examiner*—Brian S. Steinberger
*Attorney, Agent, or Firm*—Timothy D. Stanley

[57] ABSTRACT

A borehole logging method and system are provided for obtaining a measure of formation anisotropy in formations adjacent the borehole. The system comprises an elongated housing for suspension within the borehole. First and second asymmetric pressure wave sources for generating shear waves directly within formations adjacent the borehole are mounted with the housing. Additionally, first and second sets of receivers are mounted with the housing for recording first and second signals representative of the earth's response to the first and second shear waves propagating in the formations adjacent the borehole, respectively. The first set of receivers have an orientation matching the first source, and the second set of receivers have an orientation matching the second source. The system further includes a processor for determining a measure of formation anisotropy from the first and second recorded signals. With a first set of source/receiver pairs having matched polarizations and azimuthal orientations, first signals, representative of the imparted acoustic shear wave energy after propagation through a portion of the formations adjacent the borehole, are recorded. With a second set of source/receiver pairs having matched polarizations and azimuthal orientations different from the first set of source/receiver pairs, second signals, representative of the imparted acoustic shear wave energy after propagation through a portion of the formations adjacent the borehole, are recorded. The first and second recorded signals can be processed for events representative of first and second shear wavefront arrivals of the imparted acoustic shear wave energy. Formation anisotropy can be characterized with measures of the events representative of the first and second shear wave arrivals in the first and second recorded signals.

18 Claims, 6 Drawing Sheets

ACOUSTIC WELL LOGGING METHOD AND SYSTEM FOR OBTAINING A MEASURE OF FORMATION ANISOTROPY

BACKGROUND OF THE INVENTION

The present invention relates generally to an acoustic well logging method and system for examining the earth's subsurface formations surrounding a borehole and more particularly, it relates to an improved method and system for acoustic well logging to obtain a measure of formation anisotropy surrounding the borehole.

It is a well known practice to survey formations adjacent to and surrounding well boreholes by acoustic logging techniques in which acoustic signals are generated and received by means of a logging tool run through the well borehole. Conventional acoustic well logging techniques involve generating and recording of axis symmetric pressure waves. The recorded signals provide a measure of the compressional wave velocity in the earth's formations surrounding the borehole. Such techniques generally depend upon the generation and detection of pressure waves and the determination of the traveltime of the pressure waves between the source and the receiver or between spaced receivers. By these techniques, the velocity of compressional waves through the subterranean formation surrounding the borehole can be determined in order to characterize the formation. The conventional acoustic well logging systems generally include a logging sonde suitable to be suspended in the borehole, a source with the sodde for generating axisymmetric pressure waves in the borehole fluid and one or more receivers with the sonde and spaced apart from the source for detecting pressure waves in the borehole fluid. The pressure waves in the borehole fluid generated by the source are refracted into the earth's formation surrounding the borehole. They then propagate through a portion of the formation, are refracted back into the borehole fluid at a point adjacent to the receiver and are then detected. The ratio of the distance between the source and receiver to the time between the generation and detection of the pressure wave can yield the compressional wave velocity of the formation.

When a pressure wave generated in the borehole fluid reaches the borehole wall, it can produce a refracted compressional wave in the surrounding earth formation as described above. In addition, the pressure wave can also produce a refracted shear wave in the surrounding earth formation as well as guided waves which travel partly in the borehole fluid and partly in the formation adjacent the borehole. Part of the shear wave is refracted back into the borehole fluid in the form of a pressure wave and is detected by the receiver in the sonde. Guided waves are similarly detected by the receiver. Any wave that is one of the three types of waves detected by the receiver can be called an arrival; the pressure wave in the borehole flui which is caused by refraction of compressioaal waves in the formation, the compressional wave arrival; those caused by refraction of the shear waves in the formation, the shear wave arrivals; and those caused by guided waves, the guided wave arrivals. Thus, the signal generated by the receiver is a composite signal which includes the compressional wave arrivals, the shear wave arrivals and the guided wave arrivals. Compressional waves travel faster than shear waves and shear waves usually travel faster than the guided waves. Therefore, the composite signal generated by the receiver includes the compressional wave arrivals as the first arrivals, the shear wave arrivals generally as the second arrivals, and the guided wave arrivals generally as the last arrivals.

The conventional acoustic well logging source generates pressure waves symmetrical about the logging sonde axis. When suhh symmetrical pressure waves are refracted into the surrounding formation, the relative amplitudes of the refracted shear and compressional waves are such that it is often difficult to distinguish the later shear wave arrival from the earlier compressional wave arrival and from the reverberations in the borehole caused by the refraction of the pressure wave in the formation. Therefore, it is often difficult to use as a conventional symmetrical pressure wave source for logging shear wave velocity. More recently, full wave train acoustic well logging systems have been developed to obtain a meauure of formation shear and compressional wave velocities as shown by Parks, et al. in U.S. Pat. No. 4,562,557 and Ingram, et al., in U.S. Pat. No. 4,575,830. Parks and Ingram both describe a method for estimating or determining the velocity of various arrivals in composite signals recorded by a linear array of receivers.

Recent advances in direct shear wave acoustic well logging techniques have developed sources for producing asymmetric pressure aaves for logging shear wave velocity in formations surrounding the well borehole. Exemplary of such asymmetric pressure wave sources are described in South African Patent Application No. 823678 and in Canadian Patent No. 1152201 both of which are incorporated by reference herein.

However, the acoustic well logging art has only recently addressed itself to the possibility that formations surrounding the borehole through which the acoustic energy propagates can or may be anisotropic. Implicitly, the conventional acoustic well logging techniques previously discussed require that formations surrounding the well borehole be isotropic. Indeed, there are certain rock features which can cause anisotropy and are certain rock types which can exhibit intrinsic anisotropy. Consequently, assuming that a formation surrounding the well borehole is isotropic can lead to errors of serious magnitude.

The present invention provides a solution to a need to obtain a measure of formation anisotropy with an acoustic well logging apparatus. If zones of formation anisotropy are present and not properly taken into account, acoustic well logging data will be insufficient to adequately define formation properties surrounding the well borehole. The present invention provides a method and system for obtaining a measure of formation anisotropy surroundin a well borehole. Conventional surface seismic data is almost always processed and interpreted using techniques which assume isotropic wave propagation. Consequently, knowledge of formation anisotropy, such as can be obtained from the present invention, can be used to more accurately process and interpret such seismic data.

SUMMARY OF THE INVENTION

The present invention relates to an improved acoustic well logging method and system for obtaining a measure of formation anisotropy in the earth's formation surrounding a well borehole. The system comprises a sonde for suspension within a borehole. The sonde includes first and second oriented asymmetric pressure wave sources for generating shear waves within formations adjacent the borehole and first and second sets of oriented receivers. The first and second sets of receivers each have a plurality of transducers with polarizations and orientations matching the polarizations and orientations of the first and second asymmetric pressure wave sources, respectively. The transducers in each set of receivers are a known spacing from the source such that an estimate of formation anisotropy can be obtained through velocity analysis of the recorded signals for each source receiver pair. The system also includes means for processing the recorded signals to determine a measure of formation anisotropy. With a first set of source/receiver pairs having matched polarizations, first signals are recorded representative of the formation's response to the imparted shear wave energy, and the first recorded signals are processed for events representative of first and second shear wave arrivals of the imparted shear wave energy. The first and second arrivals in the first recorded signals can be employed to characterize formation anisotropy. With a second set of source/receiver pairs having matched polarizations, second signals are recorded representative of the formation's response to the imparted shear wave energy. The second recorded signals are processed for events representative of first and second shear wave arrivals of the imparted acoustic shear wave energy. First and second arrivals in the second recorded signals can then be employed to characterize formation anisotropy. If second events cannot be determined in the first and second recorded signals and the velocities for the first events in the first and second signals are different, the formation can be characterized as anisotropic.

DESCRIPTION OF THE PREFERRED EMBODIMENT

As an aid in understanding the present invention, the following discussion is provided. Shear wave energy propagates in a direction perpendicular to the direction of its particle motion. Shear waves encountering anisotropic formations can undergo shear wave "splitting," i.e., a partitioning of the shear wave energy into two modes or components of propagation hereafter referred to as quasi shear waves. This phenomena has also been termed shear wave birefringence. Most geological processes of deposition and deformation indicate that anisotropic formations are more likely than isotropic ones. Such anisotropy evidences itself by: (1) a variation in seismic wave velocities with direction of propagation and, (2) a variation in attenuation of seismic energy with direction of propagation. Formation anisotropy can be caused by lamination, cracks, fractures, mineral alignment, foliation, jointing, cleavage, etc. The resulting formation anisotropy is most commonly modelled as two-dimensional with a unique axis, i.e., the axis of symmetry, commonly being vertical in sedimentary formations. In particular, many geological formations can be considered as transversely isotropic with a unique axis which is substantially vertical. For example, shale deposits because of their constituent mineral clays often display a pronounced but simple anisotropy.

Figure 1:
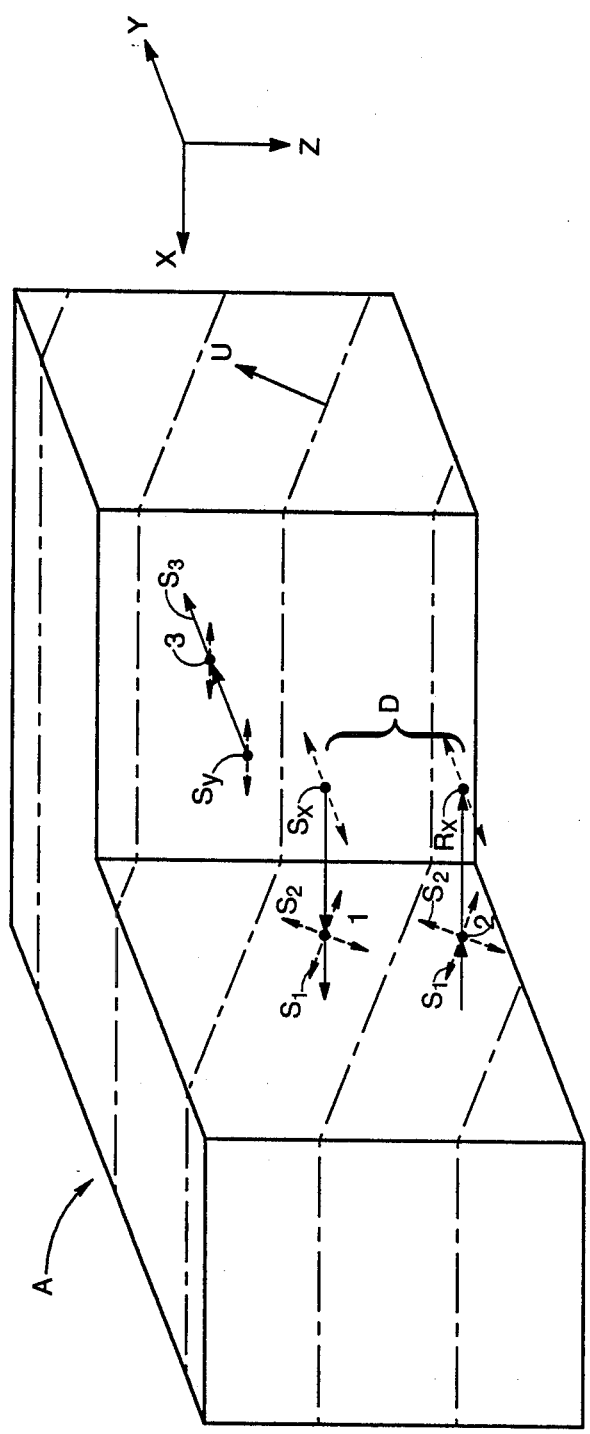
FIG. 1 is a cross sectional view of an anisotropic subterranean formation surrounding well borehole depicting shear wave propagation therein.

Considered in more detail and with reference to FIG. 1, an anisotropic formation A, having a unique axis U, surrounding a borehole is depicted. The anisotropic formation A is indicated as being a transversely isotropic laminated material (dashed lines depicting laminations) with its unique axis U oblique to the Z-axis and perpendicular to the formation bedding. The anisotropic formation A, for the purposes of discussion can be considered a transversely isotropic laminated material. For purposes of example, the Z-axis is colinear with the borehole longitudinal axis. Obviously, the situation can be symmetrical, i.e., the formation laminations or bedding layers can be horizontal and the borehole longitudinal axis deviated from the Z-axis. Those skilled in the art will appreciate that shear wave energy cannot propagate through the borehole fluid surrounding the borehole source and adjacent the borehole formations. For simplicity in the following discussion, the shear waves generated by asymmetric pressure wave sources and discussed hereafter are the result of the asymmetric pressure waves propagating in the borehole fluid being refracted by the formations surrounding the borehole.

A shear wave $S_x$ originating from an asymmetric pressure wave source within the borehole add propagating outwardly predominantly along the X-axis can have a horizontal polarization, i.e., particle motion constrained to the X-Y plane. Alternatively, the shear wave $S_x$ can have a vertical polarization, i.e., particle motion constrained to the Z-Y plane. Both shear wave polarizations can be employed equally well in the present invention. However, for simplicity of discussion, the shear wave $S_x$ will be assumed to have a horizontal polarization, as indicated by the dashed arrows in FIG. 1.

Figure 2A:
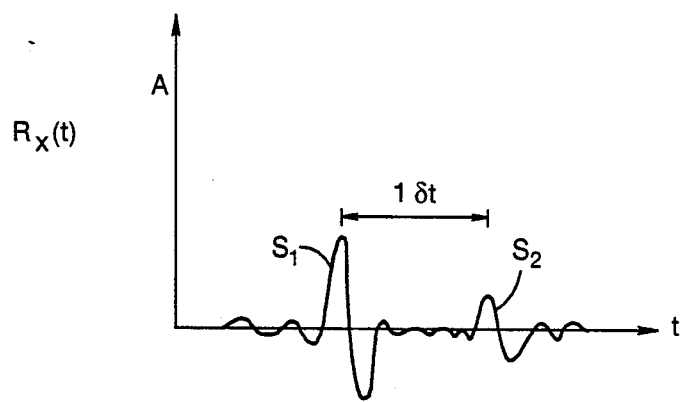
FIGS. 2a and b are schematic representations of signals recorded representative of shear wave transmission through the formation in FIG. 1.

As the shear wave $S_x$ impinges upon the anisotropic formation A at point 1 such that its polarization is oblique to the unique axis U, i.e., at any angle other than 0° or 90°, the shear wave "splits" into quasishear wave components $S_1$ and $S_2$. The particle motion for the quasishear wave components $S_1$ and $S_2$ are indicate by the dashed arrows. For the symmetry shown, quasishear wave component $S_1$ will travel at a faster speed than quasishear wave component $S_2$ because quasishear wave component $S_1$ particle motion is aligned parallel to the bedding layers while quasishear wave component $S_2$ particle motion is perpendicular to it. Furthermore, shear wave component $S_2$ will undergo more attenuation than shear wave component $S_1$ for propagation over the same distance. As the quasishear wave energy components $S_1$ and $S_2$ propagate outwardly and down the borehole formation fluid interface, the time delay between such components $S_1$ and $S_2$ increases, and the difference in the relative amplitudes of the two waves increases. At some distance along the borehole, these two quasishear waves will be detected by a receiver $R_x$. The signals recorded at the receiver $R_x$ will ideally appear as indicated in FIG. 2a. Here it is shown that a time delay $\delta t$ exists between the arrival of the quasishear wave components $S_1$ and $S_2$. This time difference is directly proportional to the distance traveled and inversely proportional to the velocities of the quasishear wave components $S_1$ and $S_2$. Furthermore, owing to the anisotropic attenuation of the two quasishear wave components, the amplitude of the quasishear wave arrivals $S_1$ and $S_2$ can be related to the formation anisotropy. The amplitudes will have a simple trigonometric relationship if the process is totally elastic; however, there can be additional degradation of the quasishear wave components $S_1$ and $S_2$ amplitudes different than the simple trignometric relation due to anisotropic attenuation.

From this point on, there can be two possible shear wave velocities $V_1$ and $V_2$ and amplitudes $A$ and $A_2$ for the quasishear wave components $S_1$ and $S_2$, respectively. The differences in velocities and amplitudes depend upon the magnitude of the formation anisotropy and the azimuthal orientation of the source/receiver pair $S_x$ and $R_x$. A receiver $R_x$, a spaced vertical distance $D$ from the shear wave source $S_x$ and having a polarization matching the shear wave $S_x$, can detect both shear wave components $S_1$ and $S_2$ as they emerge from formation A at point 2. Receiver $R_x$ will record a signal $R_x(t)$ representative of the arrival of shear wave components $S_1$ and $S_2$ as shown generally in FIG. 2a. In FIG. 2a it can be seen that two shear wavefront arrivals of the imparted shear wave energy $S_x$ are separated by a time $\delta t$ (i.e., the shear wave components $S_1$ and $S_2$ are travelling at different velocities $V_1$ and $V_2$) and have different amplitudes $A_1$ and $A_2$. For such time quasishear wave components to be observed, the pulse width of the imparted shear wavelet should be short compared to the time delay $\delta t$ or the spacing of receivers from sources should be large, e.g., 8-25 ft. The lack of velocity dispersion permits separation from the overlapping normal modes. By way of example, the quasishear waves amplitude recorded by the receiver $R_x$ a spaced vertical distance from the shear wave source $S_y$ and having a polarization matching the shear wave $S_x$ is proportional to the product of the amplitude of the imparted shear wave and $\cos\Theta$ whereas the amplitude of the recorded quasishear wave arrival $S_2$ is proportional to the product of the amplitude of the imparted shear wave and $\sin\Theta$ where $\Theta$ in both cases is the angle between the polarization of the imparted shear wave and the unique axis of the anisotropic formation.

Figure 2B:
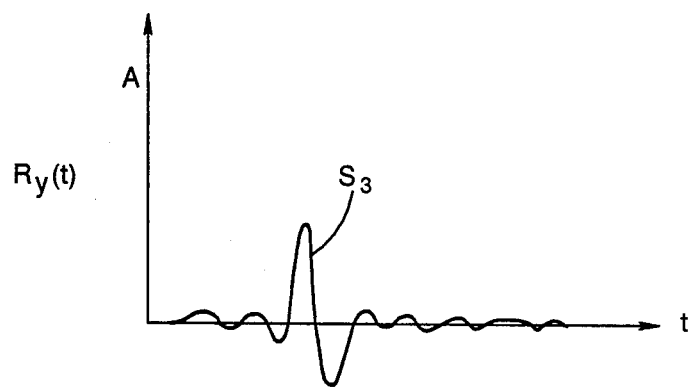

However, if a shear wave $S_y$ having a direction of propagation predominantly along the Y-axis and particle motion in the X-Y plane, as indicated by its associated dashed line, impinges upon formation A at point 3, no shear wave "splitting" results since the particle motion is parallel to the unique axis U of formation A and only the fast mode of shear wave propagation is excited i.e., having a velocity corresponding to the quasishear wave velocity $V_1$ discussed above. Lkkewise, if the particle motion were in the Z-Y plane, only the slow mode of shear wave propagation would be excited i.e., having a velocity corresponding to quasishear wave velocity $V_2$ discussed above. Hence, receiver $R_y$ (not shown), a spaced distance from the source of shear wave $S_y$ and having a polarization matching that of the source of shear wave $S_y$, will detect only one shear wave arrival (i.e., $S_3$) as it emerges from the formation A. The receiver $R_y$ will record a signal $R_y(t)$ representative of the arrival of shear wave component $S_3$ as shown generally in FIG. 2b. Note also that the arrival time for the shear wavefront arrival $S_3$ can either be coincident in time with shear wave arrival $S_1$ or $S_2$ depending upon the polarization (i.e., direction of particle motion) of the imparted shear wave $S_y$.

The situation in FIG. 1 depicts two azimuthal orientations of source/receiver pairs having matched polarizations. In acoustic well logging operations, the azimuthal orientation of each source/receiver pair can change due to rotation of the logging tool about its longitudinal axis, i.e., Z-axis. For other azimuthal orientations where the direction of particle motion for both the $S_x$ and $S_y$ sources is oblique to the unique axis U of anisotropic formation A shear wave "splitting" can result from the shear waves imparted by both sources. However, for ease of display, only two orthogonal azimuthal orientations are depicted in FIG. 1. Additionally, when shear waves impinge upon isotropic formations, no shear wave "splitting" should result and the recorded signals $R_x(t)$ and $R_y(t)$ should generally portray shear wavefront arrivals coincident both in time and amplitude.

Figure 3:
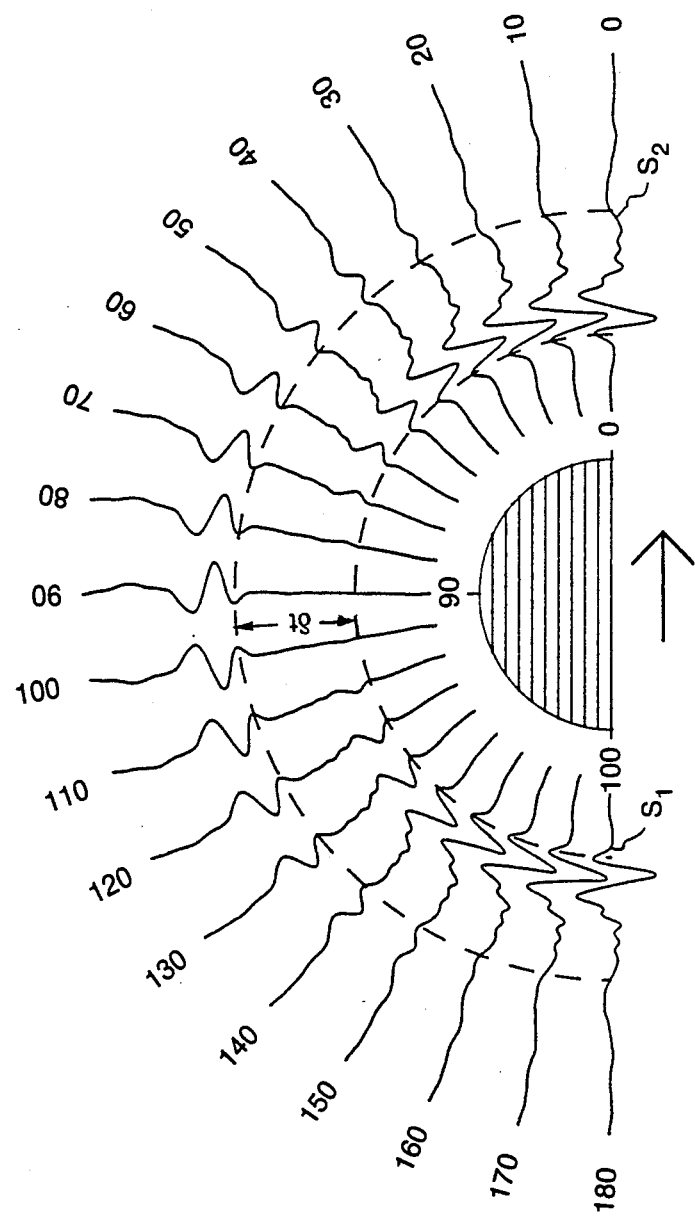
FIG. 3 is a schematic representation of the various signals that would be recorded with a source/receiver pair, having matched polarization and orientations, mounted on opposite ends of a shale sample as the orientation of the source/receiver pair is rotated 180° about the longitudinal axis of the shale sample.

When the orientation of the logging tool is such that the polarizations of both sources $S_x$ and $S_y$ are orthogonal with respect to the unique axis of an anisotropic formation, shear wave "splitting" will not occur; however, the velocities and amplitudes of the resulting shear waves will not be equal. In fact, FIG. 3 depicts the signals that would be recorded by a source/receiver pair having matched horizontal polarizations and an initial azimuthal orientation of 0°, as indicated by the arrowhead and thereafter incrementing the azimuthal orientation of the source/receiver pair through 180°. The source/receiver pair were mounted at opposite ends of a laminated cylindrical shale sample having vertical bedding planes, as indicated by the parallel lines. The azimuthal orientation of the source/receiver pair was rotated through 180° in 10° increments, and the recorded signal for each increment is depicted. One should note that at 0°, 90°, and 180°, i.e., orthogonal orientations with respect to the sample bedding planes, that only one shear wave arrival is recorded; however, the arrivals in each signal would not have the same velocity. Whereas for intermediate orientations, two quasishear wave arrivals $S_1$ and $S_2$ are shown having a substantially fixed time separation $\delta t$ but sinusoidally varying amplitudes. Each concentric ring indicated in FIG. 3 depicts a fixed time along the time axis of each recorded signal.

As a result of shear wave splitting shown in FIGS. 1 and 3, quasishear wave component $S_1$, $S_2$ of the imparted shear wave $S_x$, thereafter propagate through the formation at different velocities $V_1$ and $V_2$. Moreover, if a set of receivers, having matched polarizations to that of the imparted shear wave $S_x$, are spaced at increasing distances from the point of imparting shear waves $S_x$, each receiver of the set will record a signal representative of a measure of the earth's response to components $S_1$ and $S_2$ of the imparted shear wave $S_x$. Since the formation A is anisotropic and the velocities $V_1$ and $V_2$ are different for each component, the recorded signals $R_x(t)$ can have different shear wavefront arrival times and different amplitude values for each shear wavefront arrival. As will be more completely discussed below, these differences can be employed to obtain a measure of formation anisotropy. Conversely, if the formation is isotropic or the shear wave polarization, i.e., direction of particle motion is orthogonal with respect to the formation unique axis U, no differences should exist either in shear wavefront arrival times or amplitudes in the recorded signals.

Recalling FIG. 1 for the moment, anisotropic formations in which the imparted shear wave polarization is at an oblique angle to the anisotropic formation unique axis will "split" and the velocities of the split shear wave components will generally not be equal nor will the shear wavefront arrival amplitudes be equal. At this juncture, it is relevant to note that an oblique relationship between shear wave polarization and the formation unique axis is a necessary condition for shear wave "splitting" to occur, although, it is not necessary to obtain a measure of formation anisotropy in accordance with the present invention as was demonstrated in FIG. 3. Generally this condition can be satisfied if formation beds are slightly dipping, i.e., the formation unique axis is not truly vertical, or the well borehole is deviated, i.e., its longitudinal axis is not truly vertical, such that the shear wave polarization makes an angle oblique to the unique axis of the anisotropic formation. In fact, both conditions generally exist to some extent in all well boreholes.

Figure 4:
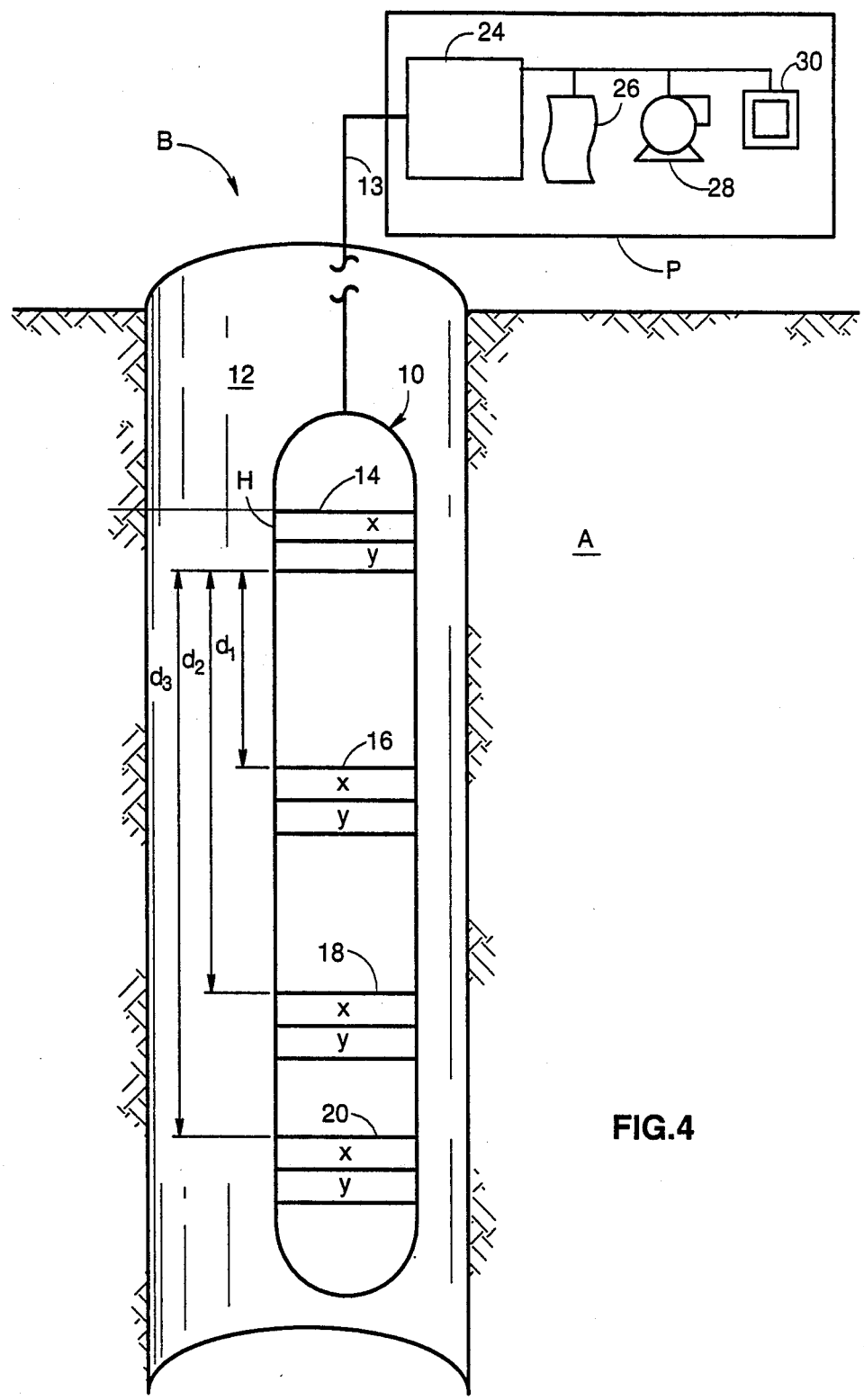
FIG. 4 is a schematic view of the present invention.

FIG. 4 provides a schematic block diagram of an acoustic logging system B in accordance with the present invention. The system B comprises a logging sonde 10 adapted to be vertically positioned within a borehole 12 with cable 13. The logging sonde 10 includes an elongated housing H having mounted therewith orthogonally arrayed asymmetric pressure wave source 14 and a plurality of orthogonally arrayed receivers 16, 18, and 20. The source 14 is comprised of orthogonally oriented dipole bender-type transducers as generally described in Canadian Patent 1,152,201 and incorporated by reference herein. In particular, a first dipole bender-type transducer 14x is mounted with the logging sonde 10 having opposed unrestricted planar surfaces with respect to the longitudinal axis ff the logging sonde 10 and having a first azimuthal orientation, e.g., along the X-axis. A second dipole bender-type transducer 14y is mounted with the logging sonde 10 having opposed unrestricted planar surfaces with respect to the longitudinal axis of the logging sonde and having a second azimuthal orientation, e.g., along the Y-axis. Preferably, the azimuthal orientation of the first transducer 14x is generally orthogonal to the azimuthal orientation of the second transducer 14y. However, it is understood by those skilled in the art that a plurality of dipole bender-type transducers having a plurality of azimuthal orientations (e.g., in increments of 360°/N where N is the number of transducers) could be also provided. Such dipole bender-type transducers develop asymmetric pressure wavss in the borehole fluid by generating a positive pressure wave in one direction an a simultaneous negative pressure wave in the opposite direction and consequently generates shear waves in the formation adjacent the borehole having preferred directions of propagation coincident with its azimuthal orientation.

The receivers 16, 18, and 20, each comprise a pair of orthogonally oriented dipole bender-type transducers of the type previously described. A first set of transducers, 16x, 18x and 20x, are mounted with the logging sonde 10 having opposed unrestricted planar surfaces with respect to the longitudinal axis of logging sonde 10 and having a first azimuthal orientation, e.g., along the X-axis. The first set of transducers 16x, 18x, and 20x are generally responsive to positive and negative pressure waves in the borehole fluid along the X-axis generated by shear waves in the formation interacting with the borehole fluid. A second set of transducers, 16y, 18y, and 20y, are mounted with the logging sonde 10 having opposed unrestricted planar surfaces with respect to the longitudinal axis of the logging sonde 10 and having a second azimuthal orientation, e.g., along the Y-axis. The second set of transducers 16y, 18y, and 20y are generally responsive to positive and negative pressure waves along the Y-axis generated by shear waves in the formation interacting with the borehole fluid. The transducers 16x, 18x, and 20x have matched polarizations and are oriented substantially in the same azimuthal direction, and the second set of receivers 16y, 18y, and 20y have matched polarizations and are oriented substantially in the same azimuthal direction. The azimuthal orientations and polarizations of receivers 16x, 18x, and 20x match the azimuthal orientation and polarization of source 14x to form a first set of matched source/receiver pairs and similarly the azimuthal orientations and polarizations of receivers 16y, 18y and 20y match the azimuthal orientation and polarization of source 14y to form a second set of matched source/receiver pairs.

The X-axis orientation of the first set of source/receiver pairs is generally orthogonal to the Y-axis orientation of the second set of source/receiver pairs. Preferably, each set of source/receiver pairs includes at least four receivers spaced at increasing distances from the source. The nearest receiver is from 8 to 25 ft from the source and each receiver is preferably spaced in 6 in. to 1 ft intervals from adjacent receivers having the same polarization and orientation.

Figure 5:
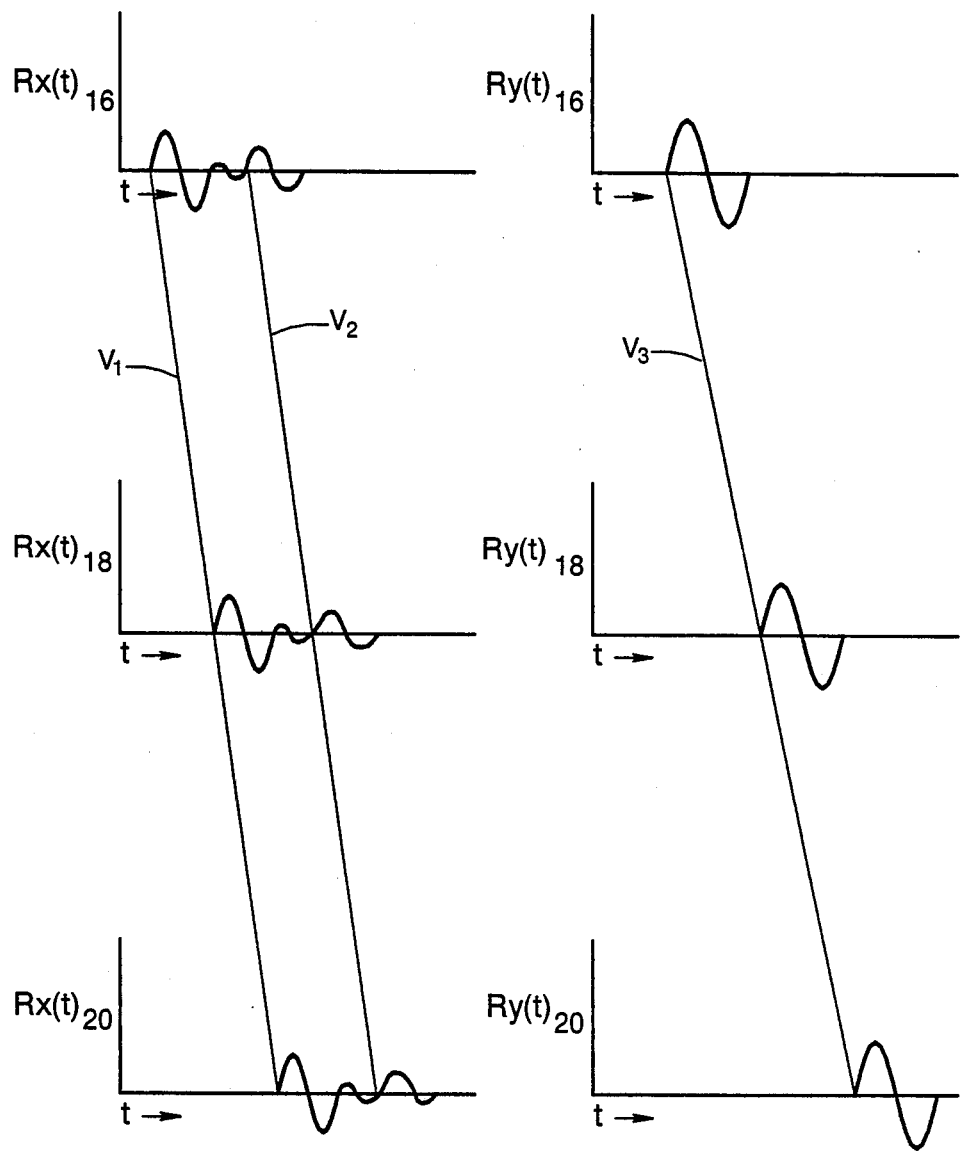
FIG. 5 is a schematic representation of the signals recorded by the various receivers in the shear wave logging system of the present invention.

Signals representative of the shear wavefronts detected and recorded by each of the receivers 16x, 18x, and 20x and 16y, 18y, and 20y are shown in FIG. 5. Hereafter, the signals generated by the first set of source/receiver pairs, having matched X-axis orientation are generally referred to as $R_x(t)$ and the signals generated by the second set of source/receiver pairs having a matched Y-axis orientation are generally referred to as $R_y(t)$ The signals $R_x(t)$ and $R_y(t)$, generated in response to the asymmetric pressure waves imparted by sources 14x and 14y respectively and the resulting shear wavefronts which propagate through a portion of the formations adjacent to and surrounding the borehole, are transmitted uphole by conductors in cable 13 to control unit P at the surface. The mode of transmission of the recorded signals can either be analog or digital.

With the logging sonde 10 suspended at selected locations in the borehole 12, source/receiver pairs can be selected upon command from surface control unit P and the source 14 can be energized to produce an asymmetric pressure wave which propagates into the formations surrounding the borehole as a shear wavefront. Commands energizing selected source/receiver pairs are sent down cable 13. The surface control unit P typically includes a central processor 24, a magnetic tape unit 26, a printer 28 and a video display unit 30. The program executing in the processor 24 is responsible for each of the commands to the sonde 10 through cable 13 for selecting source/receiver pairs, for activating the source 14 and the ascent and descent of the sonde 10, as will be described below. The upcoming signals from the sonde 10 are processed by a processor 24 and can be recorded using magnetic tape unit 26 or printed using printer 28 or visually displayed using video display unit 30. The preferred program residing within the processor 24 can process the signals at the well site during the logging operation using an arrival velocity estimation technique dsscribed herein and record the resulting velocity estimates as well as a measure of formation anisotropy as will be more fully discussed below. However, such velocity analysis technique is merely exemplary and those skilled in the art will appreciate that other velocity analysis techniques can be used.

The logging system B can be operated in a manner to measure one or more parameters ascertainable with acoustic well logging systems. The source 14 and the receivers 16, 18 and 20 can be controlled through suitable circuitry located either in the surface control unit B or in the logging sonde 10 itself. Typically, the control circuitry will comprise a time generator which operates to produce pulses to excite the source 14 and activate receivers 16, 18, and 20. For example, the time generator can generate a triggering pulse which produces a pulse repetition rate from source 14. Receivers 16, 18 and 20 can be gated alternately in order to prevent cross feed within cable 13.

The processor 24 includes means for processing the signals $R_x(t)$ and $R_y(t)$ generated by the receivers $16x$, $18x$, $20x$ and $16y$, $18y$, $20y$, respectively. With reference now to FIG. 5, it can be seen that source/receiver pairs of a selected orientation, e.g. x or y, separately generate signals $R_x(t)_{16}$, $R_x(t)_{18}$, $R_x(t)_{20}$ or $R_y(t)_{16}$, $R_y(t)_{18}$, $R_y(t)_{20}$. Since the receivers 16, 18, and 20 are spaced at increasing distances (i.e., $d_1$, $d_2$, and $d_3$) from the source 14, shear wavefront arrivals at each receiver 16, 18, and 20 occur at increasing times. Employing a velocity analysis technique, at the surface, the processor operates on the signals $R_x(t)$, $R_y(t)$ from the receivers 16, 18, and 20 to produce measures representative of the travel-timed (or conversely velocities) and the difference in the amplitude in the shear wavefront arrivals in the recorded signals $R_x(t)$ and $R_y(t)$.

As the logging sonde 10 is positioned in the borehole 12, the source 14 is periodically activated and asymmetric pressure waves impinge upon the borehole wall causing shear wave energy to be refracted into the formation A surrounding the borehole 12. The shear wave seismic energy thus developed propagates through the formations and is eventually refracted back into the borehole 12 and detected sequentially by receivers 16, 18, and 20. Since the source 14 generates shear wave energy of a predominant polarization formation surrounding the borehole, the receivers 16, 18 and 20 detect that predominant polarization of the shear wave energy imparted into the formation.

In anisotropic formations, the signals recorded by the X-axis oriented set of receivers $16x$, $18x$, and $20x$ can detect a signals $R_x(t)$ having different shear wavefront arrivals from the signals $R_y(t)$ recorded by the Y-axis oriented receivers $16y$, $18y$, and $20y$. If the formation traversed by the shear wave energy is isotropic, then the shear wavefront arrivals will occur at the same time in the signals $R_x(t)$ and $R_y(t)$. Consequently, in situations where shear wave birefringence occurs, one can obtain an estimate of both the magnitude of the anisotropy through velocity analysis techniques and provide relative measures of the attenuation which can be useful in identifying the causes of the observed anisotropy.

Figure 6:
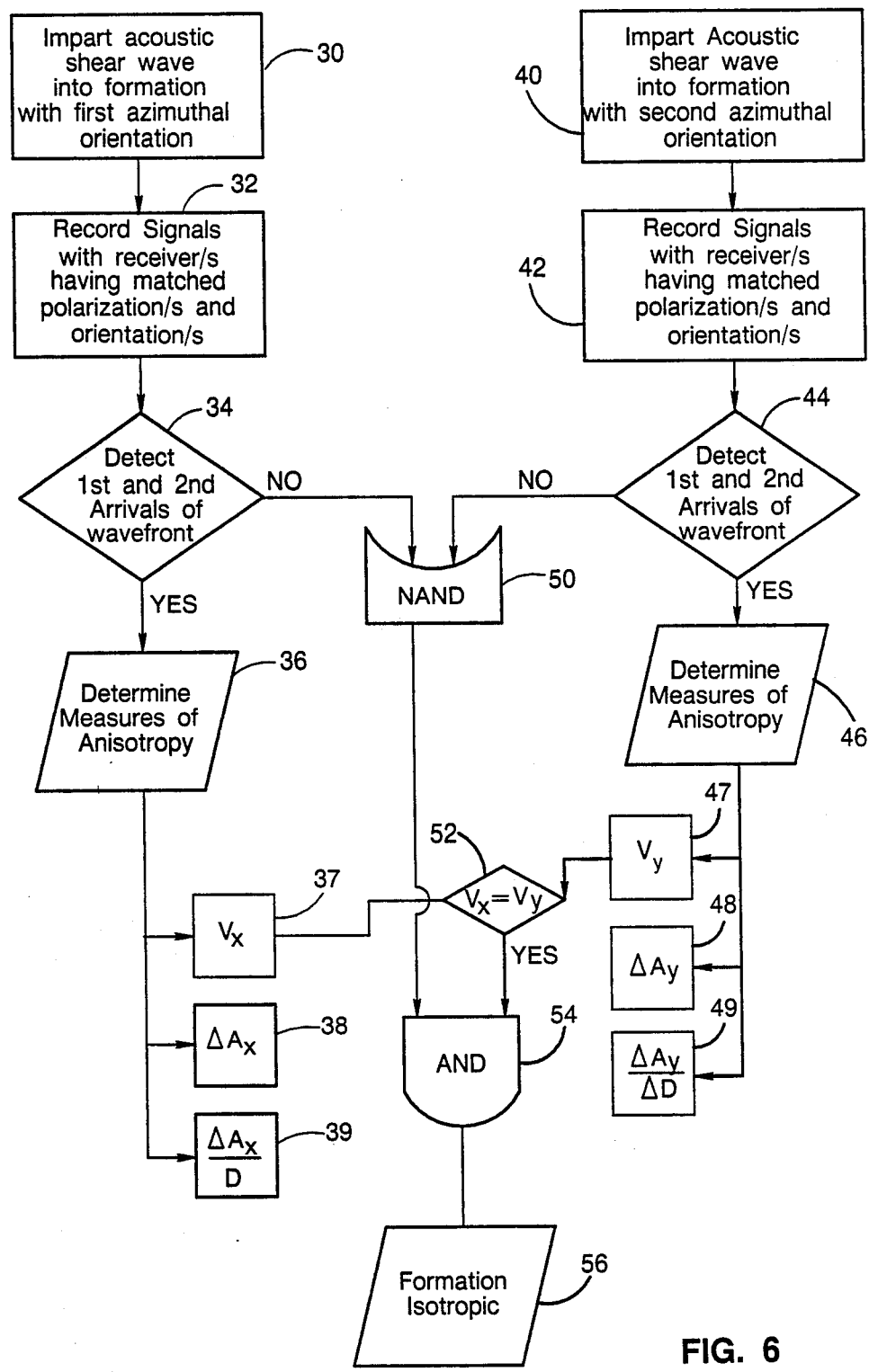
FIG. 6 is a block flow diagram of the method of the present invention.

Looking now to FIG. 6, a generalized flow diagram of the method of the present invention is set forth. In accordance with the present invention, shear wave acoustic energy having a first orientation is imparted into formations adjacent the borehole at selected locations by source $14x$ and signals $R_x(t)$ are recorded by receivers $16_x$, $18_x$, and $20x$, having matched polarizations and orientations at 30. At 32, the recorded signals $R_x(t)$ are processed by processor 24 to detect shear wavefront arrivals.

A first feature of such processing at 32 is to determine shear wavefront arrival times and velocities within the recorded signals $R_x(t)$ by the use of nonlinear Nth root stacking. Nth root stacking is a technique very easily handled within a microprocessor to provide enhancement of data. In particular, Nth root stacking is used to enhance shear wavefront arrivals in the recorded signals $R_x(t)$ by suppressing uncorrelated noise. The second feature of the processing at 32 is the use of a time window about lines representative of decreasing velocities (or increasing slowness). At the outset it should be noted that because this technique is nonlinear, some distortion of the signal waveform can result. The preferred method of Nth root stacking is set forth in Equation (1) below:

$$Q_i = 1/M \Sigma \text{sign}(Y_{ij})(Y_{ij})^{1/N} \text{ and} \quad (1)$$

$$S_i = \text{sign}(Q_i)(Q_i)^N$$

$$A_i = \Sigma |Y_{ij}|$$

$$H_i = S_i/A_i + G$$

where sign is the positive or negative sense of the quantity in parentheses; and
where M is a constant;
where G is a constant;
where $Y_{ij}$ is the amplitude of the signal j at time i;
where $A_i$ is the sum of the absolute values;
where $Q_i$ is an intermediate quantity;
where $S_i$ is the Nth root stacked sample at time i; and
where $H_i =$ is the normalized Nth root stacked sample having values ranging from 0 to 1.

The Nth root exponent N is usually 4 but any value of between 1 and 20 can be useful. However, for velocity resolution purposes, a higher number is better because it tends to suppress noise.

After the Nth root stacking, the effects of the incoherent noise can be greatly reduced over the reduction obtained by simply stacking with an exponent of 1. With the Nth root stacking, the recorded sinnals $R_x(t)$, are treated as a vertical array. By stacking windowed portions of the signals along lines of constant velocities, a point by point spectrum of velocity vs time is built up. For a given receiver array geometry, the resolution of this procedure to some degree is controlled by the exponent N.

Simple linear stacking schemes (such as Nth root stacking with an exponent of $N=1$) do not produce reliable velocity spectra because these schemes do not adequately penalize a lack of coherence between traces. Semblance based schemes conversely require large numbers of numerical computations which can be computationally inefficient in small microprocessor based systems.

A first step in determining the shear wave arrival velocities in the recorded signal $R_x(t)$ at 32 is to assume a first value of slowness and for each trial slowness, a theoretical travel time is computed for the source to first and subsequent receiver distances. For such slowness, a time point on each line of the signals is computed to define an imaginary line overlying the suite of received signals $R_x(t)$. Data windows about each point of the received signals are obtained and subjected to the Nth root stacking process as set forth in Equation (1) above and the summed value $S_i$ can be plotted as a function of the assumed velocity or held in memory. Next, the assumed slowness is incremented to move the assumed points along the recorded signals $R_x(t)$. As the slowness is decreased, a new slanted window is obtained which is shifted in time. Thus, the signal waveforms are being scanned for slower velocity coherent shear wavefront arrivals which are detected later in time. In other words, the signals $R_x(t)$ are stocked along a window about a constant velocity line which intersects each of the signals where the slant of the window increases as the velocity decreases and with increasing time from the near receiver.

One of the primary benefits of Nth root stacking with assumed velocities within a specified time window is that there is no need to advance the windows for a particular slowness down the full length of the signal waveform and then return to another slowness because higher velocities desired for the interpretation purposes are received first. By increasing the assumed slowness, the processing is moving the windows to points on the signal waveforms where coherent arrivals are expected to be detected at such slowness. Therefore, the need for checking the whole signal waveform at other slowness for that particular arrival has been eliminated.

After computing the Nth root stacks for a spectrum of slowness values, the data can be formatted as a velocity spectrum, i.e., an energy-weighted distribution of the various assumed slownesses (1/velocity). The processor 24 then scans the velocity spectrum for maxima or peaks at 34. The peaks in the velocity spectrum represent event velocities and arrival times for the recorded shear wavefront arrivals which can thence be plotted at printer 26 or stored in memory of processor 24 as representing velocity estimates and arrival times for the shear wavefront arrivals as a function of depth in the borehole. If two shear wave arrivals are detected in the recorded signals $R_x(t)$, a measure of formation anisotropy can be determined at 36. Specifically, arrival times or conversely velocities of the two shear wavefront arrivals in the signals $R_x(t)$ can be determined by the processor 24 at 37 to provide a measure of formation anisotropy. The greater the difference in velocities can be equated with the more anisotropic a formation is.

Having thus obtained a measure of event velocities, the suite of signals $R_x(t)$ can be slant stacked to form a stacked signal $R_x'(t)$ and a measure of amplitude can be obtained for each of the shear wavefront arrivals in the slant stacked signal $R_x'(t)$. The magnitude of the difference in amplitudes for two shear wavefront arrivals can also provide a measure of formation anisotropy at 38, e.g., $\Delta A = A_1 - A_2$. Recalling that the amplitudes $A_1$ of shear wave arrival $S_1$ and $A_2$ of shear wave arrival $S_2$ are related to the anisotropic differences in attenuation as well as the angular relationship of the shear wave source polarization and the anisotropic formation unique axis. Additionally, the rate of change in amplitude as a function of offset between source receiver pairs can be determined at 39, i.e., $\Delta A/D$.

At 40, shear wave acoustic energy having a second orientation can be imparted into the borehole at each selected location by source $14y$ and signals $R_y(t)$ are recorded by receivers $16y$, $18y$, and $20y$. The signals $R_y(t)$ at 42 are processed by processor 24 to detect shear wavefront arrivals using the Nth root velocity analysis technique previously described. At 44, velocity spectrum of the recorded signals $R_y(t)$ are scanned to locate maxima peaks in the velocity spectra to determine if one or more shear wavefront arrivals exist within the recorded signals $R_y(t)$ The peaks in the velocity spectra can then be associated with shear wavefront arrival times and velocities.

If only one shear wavefront arrival has been detected at 50 for both signals $R_x(t)$ and $R_y(t)$ and the shear wavefront velocities are determinedtto be equal at 52, the formation can be characterized as isotropic at 56. However, if two shear wave arrivals are detected at 44, even if only one shear wave arrival is detected at 34, maasures of the formation anisotropy can be determined at 46.

In particular, the formation anisotropy can be characterized by the differences in shear wavefront arrival velocities determined from the recorded signals $R_7(t)$ at 47, as well as the differences in the recorded amplitudes of the shear wavefront arrivals at 48. Additionally, the rate of change of amplitude as a function of offset can be obtained at 49 to further characterize formation anisotropy. Hence, to characterize a formation as anisotropic requires only one set of source/receiver pair orientations.

While a particular preferred embodiment of the present invention has been described, it will be understood that the invention is not so limited. Rather those skilled in the art will recognize that certain modifications to the method and system can be made which are comprehended by the following claims. For example, those skilled in the art would appreciate that an omnidirectional receiver responsive to shear wave energy could also be employed.

What is claimed is:

1. A system for acoustic well logging of formations surrounding a borehole to obtain a measure of formation anisotropy comprising:
   (a) elongated housing means for controlled vertical positioning within a borehole;
   (b) first asymmetric pressure wave source means mounted with the elongated housing means having a first azimuthal orientation for generating shear waves in formations surrounding the borehole;
   (c) first receiver means mounted with the elongated housing means and having an azimuthal orientation matching that of the first source means, wherein the first receiver means is a spaced distance from the first source means, for recording first signals having one or more events representative of separate modes of shear wave progagation of the shear waves generated by the first asymmetric source means;
   (d) second asymmetric pressure wave source means mounted with the elongated housing means having a second azimuthal orientation for generating shear waves in formations surrounding the borehole;
   (e) second receiver means mounted with the elongated housing means and having an azimuthal orientation matching that of the second source means, wherein the second receiver means is a spaced distance from the second source means, for recording second signals having one or more events representative of separate modes of shear wave propagation of the shear waves generated by the second asymmetric source means;

(f) means for processing the first and second recorded signals the separate modes of shear wave propogation for the events in each recorded signal; and (g) means for detecting first and second events in each recorded signal representative of first and second modes of shear wave progation and for determining a measure of formation anisotropy from the difference in the velocities of the first and second modes of shear wave propagation.

2. The system of claim 1 wherein the first and second azimuthal orientations of the first and second source means are orthogonal.

3. The system of claim 1 wherein the processing means further includes:
means for slant stacking the first recoreded signals with the respective measures of shear wave velocities; and
means for obtaining a measure of each formation's anisotropy from differneces in amplitude of the events representative of the first and second modes of shear wave propagation in the slant stacked first recorded signals.

4. The system of claim 1, wherein the first asymmetric source means comprises a dipole bender type transducer having a first azimuthal orientation and the second asymmetric source means comprises a dipole bender type transducer having a second azimuthal orientation.

5. The system of claim 4 wherein the first receiver means comprise a set of at least four dipole bender type transducers having azimuthal orientations coincident with the azimuthal orientations of the first asymmetric source means, wherein each of the dipole bender type transducers is spaced at increasing vertical distances from the first asymmetric source means.

6. The system of claim 4, wherein the second receiver means comprises a set of at least four dipole bender type transducers having azimuthal orientations coincident with the azimuthal orientations of the second asymmetric source means, wherein each of the dipole bender type transducers is spaced at increasing vertical distances from the second asymmetric source means.

7. The system of claim 1 wherein the processing means further includes:
means for slant stacking the second recorded signals with the respective measures of shear wave velocity; and
means for obtaining a measure of each formation's anisotropy from differences in amplitude of the events representative of the first and second modes of shear wave propagation in the slant stacked second recorded sgnals.

8. A method of acoustic well logging for characterizing formation anisotropy of formations surrounding a borehole, comprising the steps of:
(a) recording first signals representative of the propagation of acoustic shear wave energy through portions of the formations surrounding the borehole with a first source and receiver pair suspended in the borehole having matched polarizations and orientations wherein the first recorded siganls include one or more events representative of separate modes of shear wave propagation through the formations surrounding the borehole;
(b) processing the first recorded signals and obtaining measures representative of the velocities of the separate modes of shear wave propagation of the acoustic shear wave energy; and (c) detecting first and second events in the first recorded signal representative of first and second modes of shear wave propagation and determining a measure formation aistotropy from the differences in the velocities of the first and second modes of shear wave propagation in hhe first recorded signal.

9. The method of claim 8, further including determining a measure of the differences amplitude for the events representaiive of the first and second shear wave modes of progation in the first recorded signal.

10. The method of claim 8, further including the steps of:
(a) recording second signals representative of the propagation of acoustic shear wave energy through portions of the formations surrounding the borehhole with a second source and receiver pairs suspeneded in the borehole having matched polarizations and orientations, wherein the orientations of the first and second source and receiver pair are different from the first source and receiver pair and the second recorded signals include events representative of separate modes of shear wave propagation of the acoustic shear wave energy;
(b) processing the second recorded signals and obtaining measures representative of the velocities of the separate modes of shear wave propagation of the acoustic shear wave energy; and
(c) detecting first and second events in the second recorded signal representative of first and second modes of shear wave propagation and determining a measure of formation anisotropy from the differences in the velocities of first and second modes of shear wave propapation in the second recorded signals.

11. The method of claim 10, further including the step of characterizing the formation surrounding the borehole as anisotripic if the events representative of separate modes of shear wave propagation in the first and second recorded signals cannot be detected and the velocities for the events representative of one mode of shear wave propagation in the first and second recorded signals are different.

12. The method of claim 10, further including determining a measure of the differences in amplitude of the events representative of the first and second modes of shear wave propagation in the second recorded signal.

13. The method of claim 10, wherein the orientations of the first and second source and receiver pairs are orthogonal.

14. The method of claim 10, further including the step of charccterizing the formation surrounding the borehole as isotropic if the events representative of the second mode of shear wave propagation cannot be determined in the first and second recorded signals and the velocities for the events representative of the first mode of shear wave propagation in the first and second recorded signals are equal.

15. A system for acoustic well logging of formations surrounding a borehole, comprising:
(a) elongated housing means for controlled vertical positioning within a borehole;
(b) first asymmetric pressure wave source means mounted with the elongated housing means having a first azimuthal orientation for generating shear waves in formations surrounding the borehole;
(c) first receiver means mounted with the elongated housing and having an azimuthal orientation matching that of the first source means, wherein the first receiver means is a spaced distance from the first source means, for recording first signals having one or more events representative of separate modes of shear wave propagation of the shear waves generated by the first asymmetric source means;

(d) second asymetric pressure wave source means mounted with elongated housing means having a second azimuthal orientation for generating shear waves in formations surrounding the borehole;

(e) second receiver means mounted with the elongated housing means and having an azimuthal orientation matching that of the second source means, wherein the second receiver means is a spaced distance from the second source mean, for recording second signals having one or more events representative of separate modes of shear wave propagation of the shear waves generated by the second asymmetric source means; and (g) means for detecting the events in each recorded signal representative of separate modes of shear waves propagation and for characerizing the formation as anisotropic if events representative of two separate modes of shear wave propagation cannot be detected in each recorded signal and the velocities of the one detected mode of shear wave propagation in each recorded signal are different.

16. A system for acoustic well logging of formations surrounding a borehole to obtain a measure of formation anisotropy comprising:

(a) elongated housing means for controlled vertical postioning within a borehole;

(b) first asymmetric pressure wave source means mounted with the elongated housing means having a first azimuthal orientation for generating shear waves in formations surrounding the borehole;

(c) first receiver means mounted with the elongated housing and having an azimuthal orientation matching that of the first source means, wherein the first receiver means is a spaced distance from the first source means, for recording first signals having one or more events representative of separate modes of shear wave propagation of the shear waves generated by the first asymmetric source means;

(d) second asymmetric pressure wave source means mounted with elongated housing means having a second azimuthal orientation for generating shear waves in formations surounding the borehole;

(e) second receiver means mounted with the elongated housing means and having an azimuthal orientation matching that of the second source means, wherein the second receiver means is a spaced distance from the second source means, for recording second signals having one or more events representative of separate modes of shear wave propagation of the shear waves generated by the second asymmetric source means; and (g) means for detecting the event in each recorded signal representative of separate modes of shear wave propagation and for characterizing the formation as isotropic if events representative of two separate modes of shear wave prpopagation canot be detected in each recorded signal and the velocities of the one detected mode of shear wave propagation in each recorded signal are equal.

17. A method of acoustic well logging for characterizing formation anisotropy, a formation surrounding a borehole, comprising the steps of:

(a) recording first signals representative of the propagation of acoustic shear wave energy through portions of the formation surrounding the borehole with a first source and reciiver pair suspended in the borehole having matched polarizations and orientations, wherein the first recorded signal include one or more events representative of separate modes of shear wave propagation of the acoustic shear wave energy through the formation surrounding the borehole;

(b) processing the first recorded signals and obtaining measures representative of the velocities of the separate modes of shear wave propagation of the acoustic shear wave energy;

(c) recording second signals representative of the propagation of acoustic shear wave energy to portions of the formation surrounding the borehole with a second source and receiver pair suspended in the borehole having matched polarizations and orientations, wherein the second recorded signal include one or more events representative of modes of shear wave propagation of acoustic shear wave energy through the formations surrounding the boreholes;

(d) processing the second recorded signals and obtaining measures representative of the velocities of the separate modes of shear wave propagation of the acoustic shear wave energy; and (e) detecting events in each of the recorded signals representative of separate modes of shear wave propagation and characterizing a formation as anisotrophic if events representative of two separate modes of shear wave propagation cannot be detected in each recorded signal and the velocities of the one detected mode of shear wave propagation in each recorded signal are different.

18. A method of acoustic well loggin for characterizing formation anisotropy, a formation surrounding a borehole, comprising the steps of:

(a) recording first signals representative of the propagation of acoustic shear wave energy through portions of the formation surrounding the borehole with a first source and receiver pair suspended in the borehole having matched polarizations and orientations, wherein the first recorded signals include one or more events representative of separate modes of shear wave propagation of the acoustic shear wave energy through the formation surrounding the borehole;

(b) processing the first recorded signals and obtaining measrues representative of the velocities of the separates modes of shear wave propagation of the acoustic shear wave energy;

(c) recording second signals representative of the propagation of acoustic shear wave energy to portions of the formation surrounding the borehole with a second source and receiver pair suspended in the borehole having matched polarizations and orientations, wherein the second recorded signals include one or more events representative of modes of shear wave propagation of acoustic shear wave energy through the formations surrounding the borehole;

(d) processing the second recorded signals and obtaining measures representative of the velocities of the separate modes of shear wave propagation of the acoustic shear wave energy; and (e) detecting the events in each recorded signal representative of separate modes of shear wave propagation and characterizing the formatoon as isotropic if events representative of two separate modes of shear wave propagation cannot be detected in each recorded signal and the velocities of the one detected mode of shear wave propagation in each recorded signal are equal.

* * * * *

UNITED STATES PATENT AND TRADEMARK OFFICE
CERTIFICATE OF CORRECTION

PATENT NO. : 4,794,572
DATED : December 27, 1988
INVENTOR(S) : Carl H. Sondergeld and Martin L. Smith It is certified that error appears in the above—identified patent and that said Letters Patent is hereby corrected as shown below:

Claim 1, Column 13, line 2, after "signals" and before "the" insert --for obtaining measures of the velocity of--.

Claim 9, Column 14, line 9, after "differences" insert --in--; lines 10-11, "shear wave modes of" should read --modes of shear wave--.

Claim 9, Column 14, line 10, "representaiive" should read --representative--.

Signed and Sealed this

Twenty-fourth Day of July, 1990

Attest:

HARRY F. MANBECK, JR.

*Attesting Officer*  *Commissioner of Patents and Trademarks*